United States Patent
Ryan et al.

(10) Patent No.: US 7,566,354 B2
(45) Date of Patent: Jul. 28, 2009

(54) BAG IN, BAG OUT FILTER ASSEMBLY

(75) Inventors: Raymond F. Ryan, Leland, NC (US); John H. McNally, Leland, NC (US)

(73) Assignee: Flow Sciences, Inc., Leland, NC (US)

( * ) Notice: Subject to any disclaimer, the term of this patent is extended or adjusted under 35 U.S.C. 154(b) by 369 days.

(21) Appl. No.: 11/375,158

(22) Filed: Mar. 14, 2006

(65) Prior Publication Data

US 2007/0214961 A1    Sep. 20, 2007

(51) Int. Cl.
 *B01D 46/12*  (2006.01)
 *B01D 29/01*  (2006.01)
(52) U.S. Cl. .................. 55/385.1; 55/361; 55/467; 55/472; 55/480; 55/481; 55/506; 55/DIG. 3; 55/DIG. 8; 15/314; 15/327.2; 285/7; 285/361
(58) Field of Classification Search .............. 55/361, 55/385.1, 467, 472, 480, 481, 506, DIG. 2, 55/DIG. 3, DIG. 8, 385.2; 15/314, 327.2; 285/7, 361; 454/187
See application file for complete search history.

(56) References Cited

U.S. PATENT DOCUMENTS

| | | | |
|---|---|---|---|
| 3,676,986 A * | 7/1972 | Reiling ..................... 55/472 |
| 4,193,844 A | 3/1980 | Neumann et al. |
| 4,450,964 A | 5/1984 | Wood |
| 4,521,234 A | 6/1985 | Peebles, Jr. et al. |
| 4,726,825 A | 2/1988 | Natale |
| 4,929,261 A | 5/1990 | Jacobson |
| 5,017,197 A * | 5/1991 | McGuire et al. ............. 95/284 |
| 5,039,316 A * | 8/1991 | Hunter et al. ................. 95/284 |
| 5,244,480 A | 9/1993 | Henry |
| 5,399,319 A * | 3/1995 | Schoenberger et al. ........ 96/224 |
| 5,558,112 A * | 9/1996 | Strieter .................... 134/103.2 |
| 5,725,426 A * | 3/1998 | Alvarez ..................... 454/187 |
| 5,837,040 A * | 11/1998 | Caughron et al. ............. 96/224 |
| 6,102,977 A | 8/2000 | Johnson |
| 6,149,699 A | 11/2000 | Grantham |
| 6,364,923 B1 | 4/2002 | Wiedmeyer et al. |
| 6,585,792 B2 | 7/2003 | Schneider et al. |
| 6,616,720 B1 * | 9/2003 | Smith ........................ 55/385.2 |
| 6,783,563 B1 * | 8/2004 | Eckhoff et al. ............... 55/356 |
| 6,811,587 B1 * | 11/2004 | Lorey et al. ................ 55/385.2 |
| 6,849,100 B2 * | 2/2005 | Lim et al. .................. 55/385.2 |
| 6,991,665 B1 * | 1/2006 | Allen et al. .................. 55/379 |
| 7,294,181 B1 * | 11/2007 | Smith .......................... 96/397 |
| 7,326,269 B2 * | 2/2008 | Wootton et al. ............ 55/385.2 |
| 2006/0150590 A1 * | 7/2006 | Kramer ....................... 55/361 |

* cited by examiner

*Primary Examiner*—Duane Smith
*Assistant Examiner*—Minh-Chau T Pham
(74) *Attorney, Agent, or Firm*—MacCord Mason PLLC

(57) ABSTRACT

A filter assembly attachable to the discharge opening of a contaminated air source includes a filter having an outer periphery; a flexible conduit having a continuous side wall, an outer end attachable to the discharge opening, and an inner end attachable about the periphery of the filter; and a flexible side protrusion extending from the conduit sidewall, the protrusion having an inner end in communication with the interior of the conduit and a closed outer end. The filter can be mounted within an enclosure with an inlet opening and a discharge outlet, the conduit extending through the inlet opening and the filter being located within the enclosure.

9 Claims, 2 Drawing Sheets

BAG IN, BAG OUT FILTER ASSEMBLY

BACKGROUND OF THE INVENTION (1) Field of the Invention

The present invention relates to an air filtration assembly for use in filtering air containing toxic contaminants discharged from a contaminated air source, and in particular to a filtration assembly that can be replaced without the escape of contaminated air.

(2) Description of the Prior Art

Various processes and activities, whether of an industrial or research nature, have the potential to discharge toxic contaminants into the air within the work area. "Toxic contaminants" or "contaminants" as used herein includes numerous types of chemical and biological materials that can be harmful to humans, even in small quantities. Filtration of the air to remove such contaminants is essential. Therefore, most contaminant generating processes include a means for conveying contaminated air through a filtration system, normally including one or more particulate filters, e.g., HEPA (high efficiency particulate air) filters, that are capable of removing the contaminants, including very small toxic particles.

Preferably, the system is designed so that the filter and its support housing can be replaced without discharging contaminated air into the surrounding area. This result is commonly achieved with the use of an assembly known as a bag-in, bag-out filter assembly. When using this assembly, the filter, including its surrounding frame, is enclosed within an in-line conduit downstream of the contaminated air source and upstream of the discharge opening. The filter is normally inserted into the conduit behind a closeable opening in the conduit wall. The conduit opening usually includes a peripheral mounting flange. The mouth of a plastic bag sized to receive the filter assembly is mounted onto the flange over the opening.

When replacement of the filter is required, the operator withdraws the contaminated filter from the housing and into the bag. The bag is then tied off between the contaminated filter and the housing opening at two spaced locations. The operator then severs the bag between the locations, enclosing the contaminated filter within the bag and leaving a stub of the bag upper end still attached to the flange and extending across the opening. Alternatively, the bag may be sealed with a heated sealing device and the bag cut between the upper and lower edges of the seal.

The operator then attaches a second bag containing a new filter assembly onto the flange over the stub and then works through the second bag to detach the stub from the flange. The new filter assembly is then inserted into the opening, with the stub remaining in the bag.

Obviously, this is a time consuming and cumbersome procedure. More importantly, however, this procedure leaves the conduit without a filter from the time that the contaminated filter is withdrawn until the new filter is inserted. During this time, contaminated unfiltered air is conveyed through the conduit and discharged downstream creating a considerable risk in the case of some contaminants. In order to avoid this problem and the concomitant risk, such prior art systems often include a parallel filter that is used when the first filter is being replaced. This parallel filter system adds considerably to the cost of the system and operating expense, since two filters now have to be changed.

What is needed is a filter assembly and method that permits a quicker and simpler replacement of contaminated filters, a system incorporating this assembly to avoid the discharge of contaminated air during filter changes, and a method for implementing this filter change with the filter assembly.

SUMMARY OF THE INVENTION

The present invention is directed to an improved replaceable filter assembly for use in the filtration of contaminated air discharged from a source. The invention relates especially to a filter assembly that can be attached over the discharge opening of a contaminated air source, as opposed to within a conduit upstream of the discharge opening, with the filter being capable of being replaced as required without discharging a quantity of the contaminated air into the surrounding environment through an open conduit.

Generally, the filter assembly of the present invention is comprised of a flexible conduit having a continuous side wall with an outer end attachable to the discharge opening of a contaminated air source and an inner end, and a filter attachable to the inner end of the conduit, whereby contaminated air discharged through the conduit must pass through the filter. The conduit sidewall includes a protrusion opening intermediate the conduit's inner and outer ends, with an outwardly extending, flexible side protrusion having an inner end in communication with the sidewall opening conduit sidewall and a closed outer end. The assembly also includes means to close the conduit between the first end and the protrusion opening.

The filter and inner end of the conduit are preferably enclosed in a filter enclosure during use. The filter enclosure is preferably a rectangular box-like enclosure shaped and sized to receive a filter and includes opposed side walls joined at their ends by opposed end walls, a top wall and a bottom wall. The conduit extends into the interior of the housing through an opening in one of the walls, e.g., the top wall, while a discharge opening is included in one of the other walls, e.g., one of the side or end walls. The filter is mounted across the inner end of the conduit, extending across the interior of the housing between the side and end walls, and between the housing inlet and discharge openings. The housing can be constructed of any non-porous material, including wood, metal, plastic, wood sheathed with a metal skin, etc.

The protrusion opening is located in the conduit side wall intermediate the ends of the conduit and is sized to join the inner end of the protrusion. The protrusion is also of a tubular shape and has a closed outer end and an inner end joining the protrusion opening, e.g., by being sealed or otherwise joined in an airtight manner along the periphery of the mouth at the inner end to the periphery of the protrusion opening so that the protrusion is in communication with, and insertable into the interior of the conduit. The protrusion opening, and thereby the protrusion is located at a length from the outer end of the conduit that is preferably equal to or less than the length of the protrusion.

Unlike prior art bags that are used simply to enclose the filter during changing and subsequent removal of the contaminated filter, the conduit of the present invention serves as an operative component of the overall system, conveying contaminated air from the source discharge opening to the filter. Therefore, the filter assembly conduit is normally constructed of a heavier material than the storage bags used in the prior art, making manipulation through the conduit sidewall difficult. This difficulty is overcome through the use of the protrusion.

In use, the mouth of the conduit outer end is mounted over the flange of the contaminated air source discharge opening with first and second clamps, e.g., band clamps that can be fitted around the conduit and flange and tightened to create an airtight seal. Air discharged from the source is conveyed through the conduit and the filter from the filter's inner surface to its outer surface to remove any contaminants, with the cleaned air being discharged from the outer surface of the filter. Preferably, filter is mounted within an enclosure, and the air is drawn through the conduit and filter by a motorized exhaust fan located in the enclosure between the filter and the enclosure discharge opening.

When the filter requires changing, the conduit is closed at spaced locations adjacent the source discharge opening, e.g., by tying the conduit at spaced locations, or by sealing the conduit along an area. The conduit is then cut between the tied locations or between the upper and lower edges of the sealed area, resulting in a separated filter having a conduit with a closed upper end, and a sealed stub of the conduit extending across the source discharge opening.

The filter and lower part of the conduit are then disposed of in an appropriate manner. If the filter is within an enclosure, the cover or lid of the enclosure can be removed to replace the filter and a new filter can be inserted into the enclosure with the conduit extending through an inlet opening in the enclosure.

One of the two closure means used to seal the inlet end of the conduit to the discharge source flange is then removed. The new filter assembly is then attached to the flange of the discharge source by fitting the outer end of the new filter assembly conduit over the flange and existing stub, and clamping the inlet end to the flange with the previously removed closure means. The second closure means can be removed and replaced with a resilient band, e.g., a length of surgical tubing stretched and tied about the conduit in replacement of the second closure means.

The operator then pushes the protrusion into the interior of the conduit and reaches into the protrusion to disconnect the stub from the discharge opening, disconnecting the second closure means that holds the stub in place, if required, or simply pulling on the stub if the second closure means has been earlier replaced with the resilient band. The stub and second closure means are then pulled into the protrusion, which is withdrawn from the interior of the conduit. If desired, the protrusion can then be tied off adjacent the conduit to retain the stub and second closure means within the protrusion. Upon removal of the stub, air discharged from the source discharge opening is conveyed through the conduit and filter of the new filter assembly. A second closure means is then attached over the conduit and flange.

Thus, the present invention permits quick replacement of a filter within the discharge opening of a contaminated air discharge source without the cumbersome and time consuming requirement of withdrawing a filter from the discharge source into a bag, attaching a new bag containing a new filter, and then inserting the new filter into the discharge source housing. Moreover, removal of the stub of the preceding filter assembly is facilitated by the inclusion of the protrusion that can be inserted into the conduit to more readily access the stub and the clamp or other closure means securing the stub to the flange. Most importantly, no contaminated air is discharged into the surrounding area during the filter change, and no backup filter is required.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

The following preferred embodiment describes the filter mounted within a enclosure. It will be understood, however, that filters without a surrounding enclosure are also contemplated by the present invention, as are filters mounted within other enclosure configurations.

Figure 1:
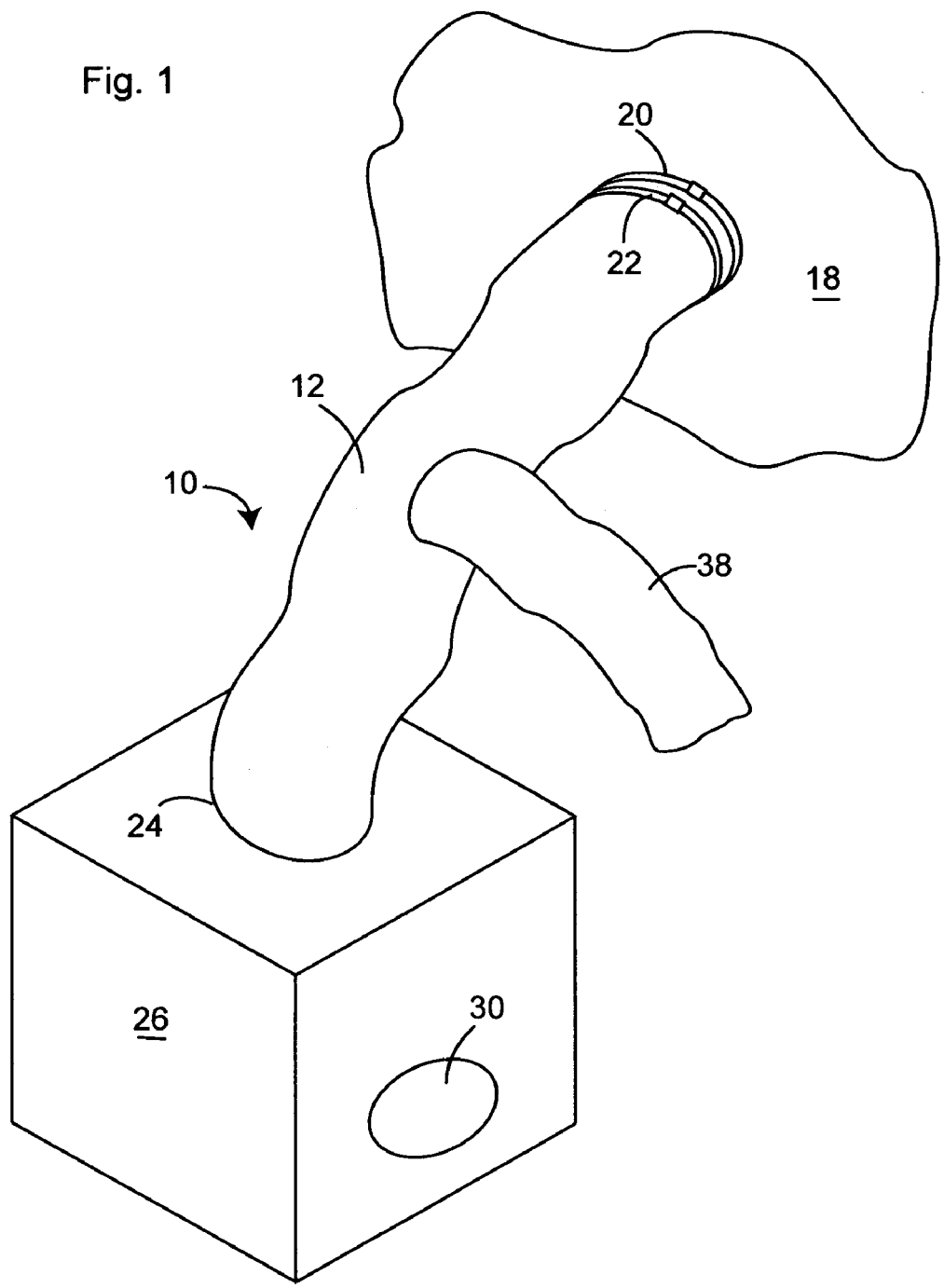
FIG. 1 is a perspective view of the filter assembly attached to the discharge opening of a contaminated air source.
Figure 2:
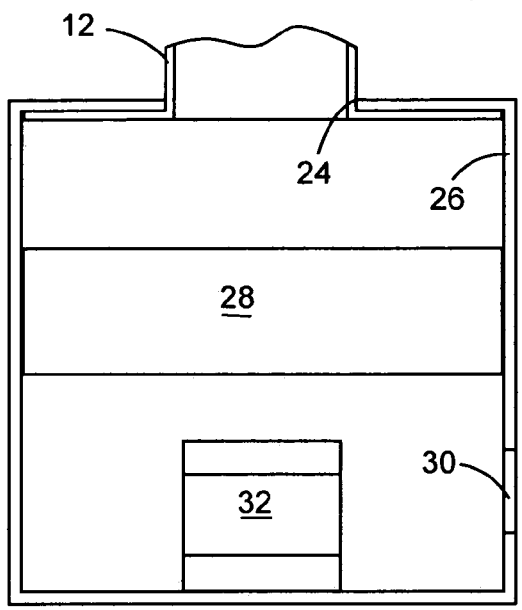
FIG. 2 is a sectional side view of the filter housing and filter of the filter assembly.

As best illustrated in FIGS. 1 and 2, the filter assembly, generally 10, of the present invention, is comprised of a flexible tubular conduit 12 having an outer end shown attached around peripheral flange 14 of discharge opening 16 of a contaminated air source 18 with band clamps 20 and 22. The inner end of conduit 12 extends through inlet opening 24 into a lidded enclosure 26 and expands outwardly to attach about the periphery of filter 28, which has upper and lower surfaces. It will be understood that attachment of the conduit "about the periphery of the filter" does not require that the conduit is attached directly to the filter, so long as all air discharged through the conduit flows through the filter from its inner surface to its outer surface. For example, a spacer, filter mount, or frame section can be located between the conduit and the filter periphery.

Enclosure 26 includes an air discharge outlet 30. Filter 28 is mounted within enclosure 26 between inlet 24 and outlet 30. Exhaust fan 32 is mounted within enclosure 26 between filter 28 and discharge outlet 30. It will be understood that the fan or other means to convey air through conduit 12 and filter 28 does not need to be located within enclosure 26. Instead the air conveyance means may be located outside of the enclosure or upstream of contaminated air discharge opening 16.

Conduit 12 includes a closed-end, tubular protrusion 38 extending outwardly from an opening in the sidewall of conduit 12 intermediate the ends of conduit 12. Protrusion 38 has a length at least equal to the distance from the outer end of conduit 12 and the joinder of protrusion 38 with conduit 12.

Figure 3:
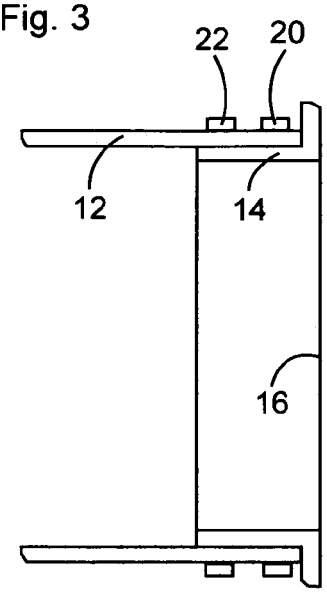
FIG. 3 is a sectional side view of the conduit attached to the discharge opening of the contaminated air source.
Figure 4:
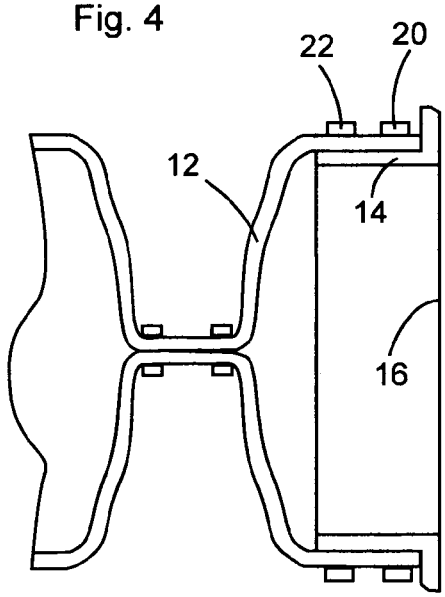
FIG. 4 is a sectional side view of the conduit attached to the discharge opening of the contaminated air source, with the conduit being closed below the discharge opening.

In use, the outer end of conduit 12 is mounted over flange 14 of source discharge opening 16 with band clamps 20 and 22 as shown in FIG. 3. Air discharged from source 18 is conveyed through conduit 12 and filter 28 by fan 32 mounted in filter housing 12 between filter 28 and discharge outlet 30. When filter 28 requires changing, conduit 12 is tied at two spaced locations adjacent discharge opening 16 as shown in FIG. 4, and severed between the ties. The resulting separated filter 28 and the attached section of conduit 12 are removed from enclosure 26 and discarded in a non-contaminating manner. A sealed stub, generally 42, is left over the discharge opening of source 16.

Figure 5:
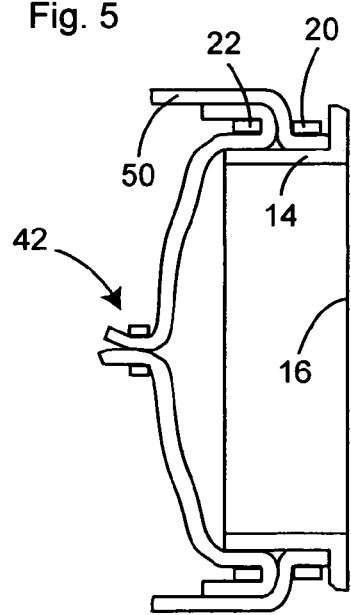
FIG. 5 is a sectional side view of the conduit stub attached to the discharge opening of the contaminated air source.

Band clamp 20 is removed as shown in FIG. 5. A new filter assembly is inserted into enclosure 26, conduit 50 of the new filter assembly is inserted through opening 24 in enclosure 26 and attached over flange stub 42 and clamp 22 with clamp 20. The operator then inserts the protrusion of the new filter assembly into and upwardly within the interior of conduit 50 and removes stub 42, disconnecting clamp 22 if required, or simply pulling on stub 42 if clamp 22 has been previously replaced by a resilient band. Stub 42 and clamp 22 or the resilient band, if used, are then pulled into the protrusion, which is withdrawn from conduit 50. A new clamp is then clamped over the outer end of conduit 50 and flange 14.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A filter assembly attachable to the peripheral flange of a discharge opening of a contaminated air source comprising:
    a) a filter having an inner surface, an outer surface, and an outer periphery;
    b) a flexible conduit having a continuous side wall, an outer end attachable to said discharge opening and an inner end attachable about the periphery of said filter, whereby air flowing through said conduit passes through said filter;
    c) an enclosure with an inlet opening and a discharge outlet, said conduit extending through said inlet opening and said filter being located within said enclosure between said enclosure inlet opening and said discharge outlet, whereby contaminated air is conveyed through said filter and out of said discharge outlet;
    d) a flexible tubular side protrusion extending from said conduit sidewall, said protrusion having an inner end in communication with the interior of said conduit between said conduit outer end and said enclosure and a closed outer end; and
    e) first and second clamps compressible around said conduit sidewall to secure said conduit to said flange.

2. The assembly of claim 1, wherein said filter is a HEPA filter.

3. The assembly of claim 1, wherein said protrusion opening is located at a given length from said conduit first end, and said protrusion has a length at least equal to said given length.

4. A method for filtering air discharged through the discharge opening of an enclosure comprising:
    a) providing a first filter assembly comprised of a first filter having an outer periphery, and a first flexible conduit having a continuous side wall, an outer end attachable to said discharge opening and an inner end attachable about the periphery of said first filter, a first enclosure with an inlet opening and a discharge outlet, said first conduit extending through said inlet opening and said first filter being located within said first enclosure between said enclosure inlet opening and said discharge outlet, whereby contaminated air is conveyed through said first filter and out of said discharge outlet, and a first flexible tubular side protrusion extending from said conduit sidewall, said first protrusion having an inner end in communication with the interior of said conduit between said second conduit outer end and said first enclosure and a closed outer end;
    b) attaching said conduit outer end over said enclosure discharge opening with inner and outer clamps;
    c) conveying contaminated air from said discharge opening through said conduit and through said filter;
    d) closing said conduit at spaced locations and severing said conduit between said spaced locations to produce a filter assembly with a conduit having a closed outer end, and a conduit stub over said discharge opening;
    e) providing a second filter assembly comprised of a second filter having an outer periphery, and a second flexible conduit having a continuous side wall, an outer end attachable to said discharge opening and an inner end attachable around the periphery of said second filter, a second enclosure with an inlet opening and a discharge outlet, said second conduit extending through said inlet opening and said second filter being located within said second enclosure between said enclosure inlet opening and said discharge outlet, whereby contaminated air is conveyed through said second filter and out of said discharge outlet, and a second flexible tubular side protrusion extending from said conduit sidewall, said second protrusion having an inner end in communication with the interior of said second conduit between said conduit outer end and said second enclosure and a closed outer end;
    f) removing said inner clamp;
    g) inserting the outer end of said second conduit over said stub and said discharge opening;
    h) clamping said second conduit onto said discharge opening with a second inner clamp; and
    i) disconnecting said stub from said discharge opening.

5. The method of claim 4, including the step of disconnecting said stub by inserting said second protrusion into said second conduit and reaching into said second conduit interior to remove said stub.

6. The method of claim 4, wherein said contaminated air source discharge opening includes a peripheral flange and said filter assembly conduit outer end includes a mouth insertable over said flange.

7. The method of claim 4, wherein said first filter assembly conduit is clamped over said opening with inner and outer clamps, said outer clamp being removed before mounting of said second filter assembly.

8. The method of claim 4, wherein said filters are particulate filters.

9. The method of claim 4, wherein the length of the first conduit from said first protrusion to said outer end is a given length, and said first protrusion has a length at least equal to said given length.

* * * * *